Patented May 30, 1939

2,159,977

UNITED STATES PATENT OFFICE 2,159,977

PROCESS OF REMOVING IMPURITIES FROM MOLTEN METALS AND A FLUX FOR EFFECTING SAID PROCESS

Isaac A. Nicholas, Pittsburgh, Pa., assignor to The Standard Lime and Stone Company, Baltimore, Md., a corporation of Maryland No Drawing. Application June 13, 1934, Serial No. 730,518. Renewed November 1, 1938

15 Claims. (Cl. 75—41)

The present invention relates to the manufacture of a flux and especially metallurgical fluxes made from a lime base which flux may be advantageously employed in removing impurities from a molten metal bath. More specifically, in accordance with the present invention, there is provided a substantially dust-free, dense reaction product of lime impregnated or partially combined with a treating agent, said reaction product being resistant to water and atmospheric deterioration, and characterized by the further property of combining more rapidly with the impurities of a furnace charge than ordinary lime or limestone.

While the present flux is especially suitable for use in iron and steel operations, in general it is capable of being used in other metallurgical operations, for example, in the smelting of copper ores.

In the smelting of iron and steel, it is customary to use limestone, that is calcium carbonate, $CaCO_3$, or lime, $CaO$, which is derived from calcination of limestone. Lime acts as a fluxing material and as a purification agent by combining with such impurities as silica, phosphorus and sulphur. Both limestone and lime have certain disadvantages when charged in an open hearth furnace. Limestone is a bulky material and, when charged into a furnace, of necessity has to first be calcined to lime by the heat of the furnace. This calcination not only robs the furnace of heat, but also lengthens the time of producing a heat of steel from one to two hours, causing a material increase in the cost of producing steel.

In recent years the use of lime $CaO$, as a flux in the iron and steel industry has increased rapidly, due (1) to the charging of a greater percentage of steel scrap in the open hearth furnaces, (2) to the increased phosphorus content of pig iron, and (3) to the demands of the trade for producing steel of better quality.

The use of burned lime as a flux in the manufacture of open hearth steel is not entirely satisfactory. One of the disadvantages when using burned lime is that under certain conditions it does not combine readily to form the desired slag. Another disadvantage is that lime, $CaO$, slakes rapidly in the atmosphere, producing a dust which is objectionable. Further, this dust causes choking of the open hearth checker chambers.

It may also be stated that burned lime, which is a bulky material, weighing approximately sixty pounds per cubic foot, necessitates large expense of handling, and involves a considerable charging time. Burned lime and limestone also take up considerable space in the furnace into which it is charged, thereby limiting the amount of metal that can be treated.

One of the objects of the present invention is to produce a material in which the above recited disadvantages are eliminated. Another object of the present invention is to produce a flux comprising a substantially dust-free, dense reaction product of lime impregnated or partially combined with a treating agent, said reaction product being resistant to water and atmospheric deterioration, and characterized by the further property of combining more rapidly with the impurities of a furnace charge than ordinary lime or limestone.

In accordance with the present invention, limestone, lime, air-slaked or water-slaked lime, or any admixture of these materials, may be burned in a kiln, preferably a rotary kiln, in the presence of a treating agent acting to impregnate the lime, and at such a temperature as will effect a substantial shrinkage of the lime. The preferred temperature range varies between 2500° and 3000° F.

The following is a specific example of the manufacture of the new flux which is adapted to supply the basic component of a basic slag functioning to remove impurities, such as phosphorus, sulphur and the like, from the molten bath containing the same.

A rotary kiln of any desired length is fed with limestone, lime, or slaked lime, and about 6% of mill scale, based on the weight of the final product, is added to the charge as it is fed to the kiln. The rotary kiln may be fired by powdered fuel, oil, or gas, to maintain the burning zone of the kiln at a temperature varying between 2500° and 3000° F. The lime base, which as herein used includes limestone, burned lime, air-slaked or water-slaked lime, and their equivalents, and the treating agent, pass through the kiln for a sufficient length of time to cause the treating agent to impregnate the lime base and/or combine therewith, and to substantially condense the lime base. As an example of a suitable rotary kiln, satisfactory results have been obtained by carrying out the present invention in a kiln 175 feet long and 10 feet in diameter, the material taking from four to five hours to pass therethrough. The time of treatment of the lime base with the treating or impregnating agent may, of course, be considerably varied, depending on the temperature of burning, the length of the kiln, and the physical characteristics of the material undergoing treatment.

Carrying out the invention in a kiln of the above type and under the conditions specified, the new fluxing product was produced at the rate of about six tons per hour.

While it is preferred to feed the treating or impregnating agent to the lime base as it is fed to the kiln, other methods of introducing the treating agent may be employed. For example, the treating agent may be introduced into the kiln in admixture with the fuel, which is preferably injected into the discharge end of the kiln. Alternatively, the treating or impregnating agent may be introduced into either end of the kiln by a separate air blast. The impregnating agent may be either in a finely divided form or in the form of larger particles or scale.

The amount of treating agent which is introduced into the kiln to impregnate the charge of lime base, may vary within considerable limits and still come within the spirit of the present invention. Preferably, the treating or impregnating agent is iron oxide in the form of mill scale. It may be added in an amount equal to 3% of the weight of the limestone introduced into the kiln, or in an amount equal to 6% of the weight of the lime charged to the kiln. As a general rule the mill scale may be varied from 2 to 26%, based on the weight of the lime charge, or 1 to 13% based on the weight of the limestone charged. These percentages are given by way of illustration and not by way of limitation, it being recognized that the percentages may be greatly varied, the limiting factor being that the treating or impregnating agent should be added in an amount sufficient to impregnate the lime base under the conditions of treatment and thereby produce a fluxing agent having the desirable properties hereinbefore mentioned.

The treating agent may be any material which will function to impregnate the lime or combine with the lime at a high temperature and accomplish the desired result. While preferably the treating or impregnating agent is a metal oxide, other treating agents may be used such as, for example, clay, silicates, blast furnace or open hearth slag, and coal or coke ashes. The preferred oxide is iron oxide, as, for example, mill scale, or iron ore such as hematite or magnetite. Instead of using iron oxides, iron turnings may be used. Other metal oxides which may be used are the manganese oxides including $MnO$, $Mn_2O_3$, $Mn_3O_4$ and $MnO_2$, nickel oxide, and chromic oxide, $Cr_2O_3$. While the metal oxides are the most satisfactory treating or impregnating agents, it is obvious that other metal compounds may be used so long as they are capable of impregnating and/or combining with the lime to cause the resulting product to be resistant to atmospheric and water deterioration, and to function as a flux having the property of more quickly combining with the slag when used in a smelting operation than lime or limestone which has previously been used. Metallic compounds which would break up under the heat within the kiln and afford the necessary oxide to function as a treating agent may be used such as iron carbonates and iron hydrates or mixtures thereof.

In general, the present invention is not limited to the use of any specific impregnating agent. Any impregnating agent may be employed which will function to confer upon the final product the desirable attributes above set forth.

At this point it is desired to state that it is within the province of the present invention to utilize a naturally occurring limestone containing such an amount of the treating agent as will effectually act to impregnate the lime base under conditions above described, including the burning of the mixture of lime base and impregnating agent to a point of incipient fusion or close thereto.

Further, the present invention contemplates utilizing the impurities present in the lime base, such as limestone or lime, as the treating agent, and adding thereto an additional amount of treating or impregnating agent to provide the amount necessary to carry out the invention. For example, if the limestone contains 1½% of iron oxide this can be utilized as a portion, at least, of the treating agent, and further treating agent added to produce the desired result. If the limestone contains approximately 1 to 3% of iron oxide, it may not be necessary to add any additional treating agent to the kiln when operating as above set forth.

While any of the fairly pure ordinary limestones well known in the prior art may be utilized in accordance with the present invention, it is preferred to use a limestone averaging 97% calcium carbonate, or a lime derived therefrom by calcination.

The particles of limestone or lime treated in accordance with the present invention may range in size from dust, that is, material passing through a sixty mesh sieve, to three inches or even larger, or may be a mixture of dust and large size particles. Heretofore the steel manufacturers have refused to utilize dusty lime as a flux, and consequently it has been necessary to screen the lime to remove the dust and small sized particles which formed a waste product. In accordance with the present invention this waste product, including dust and particles up to ⅜ of an inch or thereabouts, are used as the lime base. The limestone originally utilized is usually screened on a ⅝ screen, and here again there is a large waste of limestone, the particles of which vary in size from ⅝ of an inch down to dust, that is, sixty mesh material and finer. This material is also utilized in accordance with the present invention. In one form of the invention the waste limestone may be mixed with the waste burned lime, and the mixture burned in the presence of a treating agent as hereinbefore specified.

As above specified, the limestone or lime charged to the kiln for treatment with the impregnating agent may be composed of large particles, or of a mixture of dust and such particles. Preferably, it is desirable that the limestone or lime contain some dust, that is, material passing through a sixty mesh sieve, since this finely divided material combines more readily with the treating agent, such as, for example, iron oxide, alumina, or the like, than the larger particles, and so functions advantageously as an impregnating agent for the larger particles. In other words, the actual impregnating agent may be a combination of the treating agent, such as iron oxide or the like, and the lime. However, whatever the actual mechanism of the reaction, it is a fact that the presence of some dust does facilitate the manufacture of the product.

Another advantage of using particles of dust is that the final reaction product carries a covering material or a coating containing a higher content of iron than the remainder of the particles. The dust may be that naturally produced during and after the introduction of the lime base, such as limestone or lime, into the kiln, or may be added to the limestone or lime prior to its introduction into the kiln. While the presence of dust in a small amount is advantageous, limestone or lime substantially free of dust may be used.

In general, the limestone or lime may be pulverized, wet or dry, to a finely divided state so that, for example, 90% of the same passes through a 200 inch mesh before burning in the presence of the treating agent. Further, the lime may be air-slaked or water-slaked, the latter being in the hydrated form, and introduced in this condition into the kiln, to be burned along with the treating agent at the high temperature herein specified.

It is desired to point out that one of the high points of the present invention is the utilization of what has heretofore been waste burned lime or waste limestone, to provide a lime base which, when treated with an impregnating agent at a high temperature to form a flux, is air and water resistant and has a greatly increased activity when used as a slag-forming ingredient as compared to limestone or lime previously used. In other words, the present invention in its broadest aspect is applicable to the dust formed from waste limestone or waste burned lime, or to a mixture thereof, this dust comprising waste products which are substantially free from any of the larger lime or limestone particles as hereinbefore referred to.

While the present invention has been described in connection with the utilization of an internally fired rotary kiln, it is within the province of the invention to burn the limestone or lime, or slaked lime, in any type of furnace which will produce the necessary high temperature to form the product herein described. The invention may be carried out in an electric furnace, which gives very uniform heating, in a vertical kiln, or in any other mechanical device for burning lime.

The burning of a lime base such as limestone or the reburning of a lime base such as lime in the manner herein described produces a dense material which overcomes to a large degree the objections to its use as a flux in metallurgical operations including the manufacture of iron, steel, copper, and other metals and alloys. The burning of the lime base at a high temperature in the presence of the impregnating agent produces a lime which has been greatly condensed. In other words, the lime reaction product has become very dense, weighing usually from 100 to 130 pounds per cubic foot as compared to 60 pounds per cubic foot for ordinary fluxing lime. Since a very dense material is produced, it will take up less space in the furnace than ordinary burned lime, and, as a corollary, permit more ore or metal to be charged as well as increase the rapidity of the operation.

The metallurgical flux produced in accordance with the present invention has a much longer life when exposed to the air than ordinary lime and produces relatively little dust. The material when exposed to air, instead of slaking in from one to three days to a point where it becomes objectionable on account of the dust which is characteristic of the lime usually furnished the steel trade, will not slake appreciably for a period of from twenty to thirty days. Burned lime usually furnished the steel trade will slake in water almost instantly, but the material of the present invention will not slake if immersed in water for a considerable period of time. For example, no slaking has occurred when the material has been immersed in the water for periods of from one to three hours. The material can be handled in an open hearth stockyard and transported to the furnace in rainy weather without any covering.

One objection to the use of burned lime, CaO, as a fluxing material for an open hearth charge is its inactivity under certain conditions. In other words, the burned lime does not always readily combine to form a slag. Raw limestone is also objectionable because the carbon dioxide content must be driven off first. This results in increasing the time necessary to produce the final metal or alloy. This is particularly true in the open hearth process for the production of steel. The material produced in accordance with the present invention is very active, and, as pointed out above, speeds the operation.

It is believed that the burned lime and the impregnating agent, for example iron oxide, combine or interact to produce an impregnation of the lime particles and possibly a slight coating. It is quite probable that the reaction product of the lime base and the treating or impregnating agent is calcium ferrite or a mixture of various ferrites in which calcium ferrite is the predominant constituent. The microscopic analyses of the burned lime particles show that the large particles have an inner core of substantially pure lime and an outer shell of the reaction product between the lime and the impregnating agent, there, of course, usually being some free impregnating agent. The smaller particles, however, are impregnated throughout with the impregnating agent or the reaction product thereof with the lime base. In other words, the lime particles are surrounded by and embedded in a matrix consisting of calcium ferrite.

The present material overcomes the objections previously referred to as to its inactivity when used in open hearth furnace work. It is a fact that it does show more activity in acting on the charge. In the parlance of the steel operator, the product of the present invention when charged will come up more rapidly from the bottom of the charge than the lime or limestone previously used. Further, the product of the present invention when fed to the charge will combine more rapidly therewith and enrich the slag more quickly than the lime or limestone previously used.

The material of the present invention may be used as a corrective when the slag produced in the metallurgical operation, for example in open hearth steel production, is too silicious. The ratio of lime to silica in a good basic open hearth slag should vary from 2½ to 4. If the ratio of the lime to the silica is not within the above figures, then the present flux may be used to adjust the lime and silica content to the desired ratio. Furthermore, in a slag that is in equilibrium, the sum of the silica and iron oxide is approximately a constant percentage, namely, 36%.

Considering a slag of the following composition:

| | Per cent |
|---|---|
| $SiO_2$ | 26 |
| FeO | 10 |
| CaO | 44 |
| Other elements | 20 |

Hitherto it has been customary to add to the slag ordinary burned lime or limestone in order to obtain the proper silica to lime ratio. When ordinary burned lime or limestone is added to a slag of the above composition, the slag will not be in equilibrium, since the sum of the silica and iron oxide is not 36%. The above slag is not in equilibrium because it is deficient in iron oxide. The product of the present invention, since it contains iron, supplies to the slag the deficient iron content, and, in doing so, hastens the metallurgical process. In other words, it performs a function which is not performed by ordinary limestone or burned lime.

While I have above referred primarily to fairly pure limestone or lime as such as the base material, it is to be understood that other lime bases which are now being employed or may be employed as fluxes, may be used as the base.

I am aware that it has heretofore been proposed to produce furnace lining or patching materials, or as they are commonly known in the trade "refractories", by utilizing "a relatively pure magnesian limestone, or dolomite" rendered "dense and stable by incorporating therewith an extremely small percentage of fluxing material." See U. S. Letters Patent No. 1,230,430 to Patnoe, dated June 19, 1917. While such material has been used for producing furnace lining and patching material, it is utterly incapable of being successfully used as a flux.

The terms—lime, lime base, limestone particles, burned lime, burned limestone, and waste burned lime particles—, as employed herein and as they may appear in the claims hereinafter, are to be treated as referring to a material, or materials, having a high calcium content, as contra-distinguished from magnesian and dolomitic limes.

The material may, if necessary, be granulated and shipped in that form.

What is claimed is:

1. The process comprising purifying a molten metal bath by the action of a basic slag, the basic component of said slag having been introduced therein by the reaction product made by calcining a lime base and a fluxing agent at a temperature of the order of 2500–3000° F., said reaction product consisting of small particles of lime embedded in a matrix derived from said lime base and said fluxing agent.

2. The process comprising purifying a molten metal bath by the action of a basic slag, the basic component of said slag having been introduced therein by the reaction product made by calcining at a temperature of the order of 2500–3000° F. a lime base and a fluxing agent selected from the group consisting of an iron oxide, a manganese oxide, alumina, and an oxygen-bearing silicon-containing substance, said reaction product consisting of small particles of lime embedded in a matrix derived from said lime base and said fluxing agent.

3. The process comprising purifying a molten metal bath by the action of a basic slag, the basic component of said slag having been introduced therein by the reaction product made by calcining a lime base and iron oxide at a temperature of the order of 2500–3000° F., said reaction product consisting of particles of lime embedded in a matrix of calcium ferrite.

4. The process comprising purifying a molten metal bath by the action of a basic slag, the basic component of said slag having been introduced therein by the reaction product of a lime base and a fluxing agent, said reaction product consisting mainly of lime embedded in a matrix derived from said lime base and said fluxing agent.

5. The process comprising removing impurities, such as phosphorus, sulphur and the like from a molten steel bath by the action of a basic slag, the basic component of which has been introduced therein by the reaction product comprising mainly lime embedded in a matrix of calcium ferrite.

6. In the process of purifying steel by the action of a basic slag, the step of adding to the slag the reaction product made by calcining a lime base and a fluxing agent at a temperature of the order of 2500–3000° F.

7. In the process of purifying steel by the action of a basic slag, the step of adding to the slag the reaction product made by calcining a lime base and an oxygen-containing iron compound at a temperature of the order of 2500–3000° F.

8. The process of purifying molten iron by the action of a basic slag, the basic component of which has been introduced therein by means of a reaction product produced by sintering a mixture of a lime base and a fluxing agent selected from the group consisting of iron oxide and manganese oxide, the amount of fluxing agent being sufficient to flux only a minor portion of the lime base.

9. A flux for the metallurgy of iron which comprises a mixture of calcium oxide and an oxide of the class consisting of iron and manganese in the proportions of not more than 80% lime and over 20% of said oxides of iron and manganese, said mixture being fused to water resistant aggregates and having excess lime to combine with silica and capable of readily fusing with silica to form a readily fusible slag in a blast furnace.

10. A flux for the metallurgy of iron which comprises a mixture of calcium oxide and an oxide of the class consisting of iron and manganese in the proportions of not more than 80% lime and between 20% and 30% of said oxides of iron and manganese, said mixture being fused to water resistant aggregates and having excess lime to combine with silica and capable of readily fusing with silica to form a readily fusible slag in a blast furnace.

11. A flux for the metallurgy of iron which comprises a sintered mixture of calcium oxide and an oxide of the class consisting of iron and manganese in sufficient quantity to render said flux readily fusible and reactive with silica at the melting temperature of iron, and being sufficiently sintered to be resistant to the action of water and moisture.

12. A flux for the metallury of iron which comprises a sintered calcined limestone having disseminated therethrough an oxide of the class consisting of iron and manganese in sufficient quantity to render said calcined limestone readily fusible and reactive with siliceous materials at the temperatures prevailing in the metallurgy of iron, and being sufficiently sintered with said oxides to be resistant to the action of water and moisture.

13. As a new product, a solid readily fusible metallurgical flux for removing impurities such as phosphorus, sulphur and the like from a bath of molten metal containing the same, comprising a calcined reaction product of a material selected from the group containing an oxide of the class consisting of iron and manganese, and a burned or calcined limestone, said reaction product consisting of small particles of calcium oxide embedded in a matrix derived from said calcium base and said other reacting material, said flux being characterized by the properties of being dense and heavy, readily soluble in a molten metal bath, capable of dissolving more readily in the slag of the bath than ordinary fluxing lime or limestone and likewise being substantially free of periclase.

14. As a new article of manufacture, a solid readily fusible metallurgical flux, comprising crystals of burned calcium lime embedded in and surrounded by calcium ferrite.

15. In a process for the reduction of iron oxides by treatment in a furnace in mixture with coke and lime containing ingredients, characterized in that the usual limestone is replaced with a calcium ferrite produced by sintering iron ore with limestone.

ISAAC A. NICHOLAS.